Jan. 13, 1959 — L. M. KEY — 2,868,306
TILLER FLOAT OR LEVELING DRAG
Filed Jan. 15, 1957

INVENTOR.
Laurence Monroe Key
BY
Franklin W. Durgin
AGENT.

United States Patent Office 2,868,306
Patented Jan. 13, 1959

2,868,306

TILLER FLOAT OR LEVELING DRAG

Laurence Monroe Key, Ararat, N. C.

Application January 15, 1957, Serial No. 634,285

5 Claims. (Cl. 172—200)

This invention relates to improvements in agricultural implements and more particularly to an improved soil leveling drag suitable for use with tractor-drawn, controllable position tillers.

Among the objects of the invention are: To provide a soil leveling drag that works directly behind a tractor-drawn, controllable position tiller and which lifts off the ground and lowers into an operating position with the tiller; to provide a soil leveling drag of the type just described which can be readily attached to or detached from the tiller frame by respectively inserting or removing pins from brackets fastened to the front bar of the tiller frame; to provide a soil leveling drag that cooperates with a tiller so as to eliminate one trip over the ground with a tractor in preparing the soil for seeding and planting; and to provide a soil leveling drag that is sturdy and economical to manufacture.

Other objects and advantages of the invention will become apparent during the course of the following detailed description taken in connection with the accompanying drawing forming a part of this specification, and in which drawing, Fig. 1 is a view in side elevation of a tractor-drawn, controllable position tiller equipped with my soil leveling drag.

Figure 1:
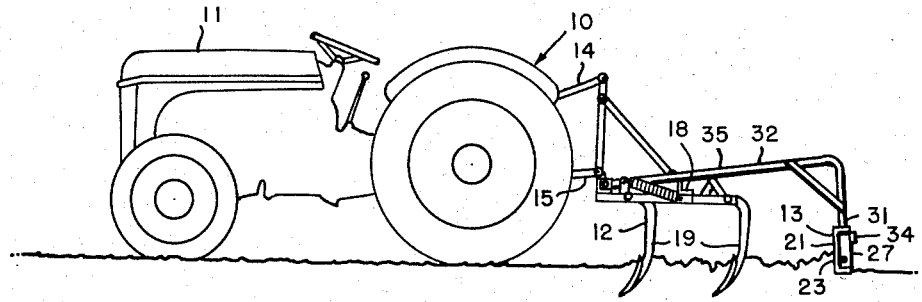

In the drawing, which for the purpose of illustration shows only a preferred embodiment of the invention, and wherein similar reference characters denote corresponding parts throughout the views, the numeral 10 generally designates the tractor-drawn, controllable position tiller and leveler shown in Fig. 1, which includes a tractor 11, the tiller 12 and the soil leveling drag 13.

In the example shown, the tractor 11 is equipped with the built-in implement hitch and position control means shown and described in U. S. Patent 2,689,513 granted to Ferguson et al., but it will be understood that any suitable connections between the tractor and tiller 12 may be provided. The linkage between the tractor and tiller comprises an upper compression link 14 and two laterally spaced, forwardly convergent lower draft links 15, 16, which pull and lift the tiller 12.

Figure 2:
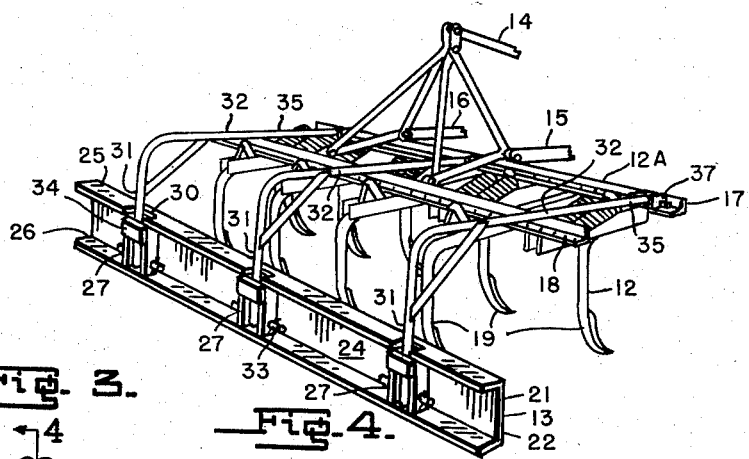
Fig. 2 is a perspective view of the tiller and soil leveling drag shown in Fig. 1.
Figures 3, 4:
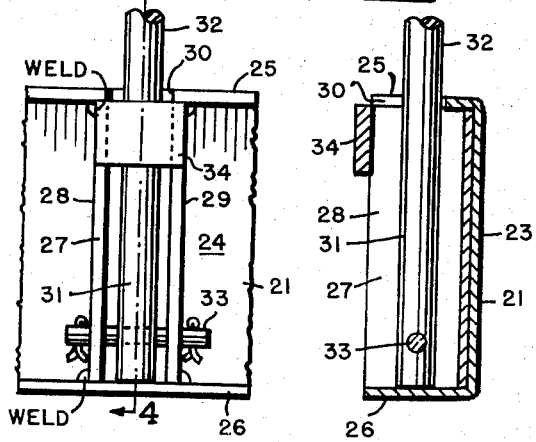
Fig. 3 is a fragmentary detail view in rear elevation of the soil leveling beam and showing a bracket preferably forming a part of the invention.
Fig. 4 is a vertical sectional view of the bracket shown in Fig. 3 and taken substantially on the line 4—4 of Fig. 3.
Figure 5:
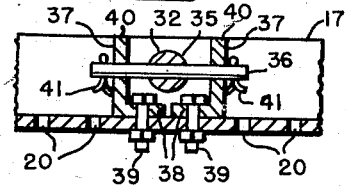
Fig. 5 is a fragmentary vertical sectional detail view of the tiller frame front bar and showing a bracket preferably forming a part of the invention.

Referring now to Figs. 1 and 2, the tiller 12 includes a frame 12A having transversely disposed front and rear angle bars 17, 18, the frame carrying front and rear rows of staggered spring-controlled tines 19. Holes 20 at short intervals in the transversely disposed angle bars 17, 18 of the frame, as shown in Fig. 5, permit variations in the tine arrangement.

The soil leveling drag 13 comprises a beam 21 of U-shape in cross-section providing a normally vertical web portion 22 having front and rear sides 23, 24, and normally rearwardly extending upper and lower reinforcing flange portions 26, 26. This beam 21 is preferably of a length somewhat greater than the width of the tiller so that it will level as well as smooth down all the soil tilled.

Affixed as by welding to the rear side 24 of the beam 21 are three spaced brackets 27 of U-shape in cross section and having spaced sidewalls 28, 29 extending between the upper and lower flange portions 25, 26. The upper flange portion 25 of the beam is provided with notches 30 aligning with the three brackets so as to receive the downturned end portions 31 of three drawbars 32.

Extending through the sidewalls 28, 29 of the brackets at their lower end portions are removable pins 33 which serve to pivotally secure the beam 21 to the drawbars at their downturned ends. Welded across the sidewalls 28, 29 of the brackets at their upper end portions are metal strips 34 forming abutments holding the downturned end portions of the drawbars within the channel brackets while permitting some pivotal play of the beam relative to the drawbars. The normally horizontally disposed forward end portions 35 of the three drawbars are of a length to pass over the rear angle bar 18 of the tiller frame.

Removable coupling pins 36 pivotally connect the forward end portions 35 of the drawbars to the forward angle bar 17 of the tiller frame, at angle brackets 37 as shown in Fig. 5. These brackets 37 have their base flanges 38 fastened to the forward angle bar 17 as by bolts 39 extending through already existing holes 20 that permit adjustment of the tiller tine spacing, as previously mentioned. The upstanding flanges 40 of the brackets 37 receive the forward ends 35 of the drawbars therebetween and also have the coupling pins 36 extending transversely therethrough so that the drag is pivotally mounted for swinging about a transverse axis relative to the tiller frame.

With the tilling and leveling equipment connected as described, the tiller depth of soil penetration may be controlled independently of the soil leveling and smoothing action of the drag. Raising of the tiller frame to an inactive above-ground position will, however, through engagement of the rear bar 18, with the drawbars 32 from underneath, automatically lift the drag from the ground. By merely removing the three coupling pins 36 at the forward end portions 35 of the drawbars, the soil leveling drag 13 is disconnected from the tiller. Any suitable means for holding the coupling pins 36 in place may be used, such as cotter pins 41 shown in Fig. 5.

Various changes may be made in the form of invention herein shown and described without departing from the spirit of the invention or the scope of the following claims.

I claim:

1. In combination with a tiller having a frame including transverse front and rear bars; a floating ground scraping and leveling drag comprising a beam having front and rear sides, and a plurality of L-shaped drawbars each having a normally substantially horizontal end portion spaced above and passing over the rear bar of the tiller frame and provided with means connected to the front bar of the tiller frame for swinging about a transverse axis, and a normally downturned end portion pivotally connected to the rear side of the ground leveling beam, and means limiting pivotal movement of the ground leveling beam relative to said downturned end portion beyond an amount permitting a predetermined degree of play during travel over the ground.

2. In combination with a tiller having a frame including transverse front and rear bars, a floating ground scraping and leveling drag comprising a beam having front and rear sides, and a plurality of L-shaped drawbars each having a normally substantially horizontal forward end portion spaced above and passing over the rear bar of the tiller frame and a normally downturned end portion, means releasably securing the forward end portions of said drawbars to selected spaced sections of said front bar for coaxial swinging movement, means releasably securing the beam at its rear side to the downturned end portions of said drawbars for pivotal movement, and means limiting pivotal movement of the ground leveling beam beyond an amount permitting a predetermined degree of play.

3. In combination with a tiller having a frame including transverse front and rear bars; a floating ground leveling drag comprising a beam having front and rear sides, and a plurality of L-shaped drawbars each having a normally substantially horizontal end portion of a length greater than the distance between the front and rear bars of the tiller frame, and a normally downturned end portion connected to the rear side of the ground leveling beam, and means pivotally connecting the horizontal end portions of said drawbars to the front bar of the tiller frame, including a pair of angle brackets having base flanges releasably affixed to the front bar and spaced to receive the horizontal end portion of one of said drawbars, and a coupling pin removably passing through said spaced upstanding flanges and said drawbar end portion.

4. In combination with a tiller having a frame including transverse front and rear bars; a floating ground scraping and leveling drag comprising a beam of U-shape in cross-section providing a normally vertical web portion having front and rear sides and normally rearwardly extending upper and lower reinforcing flange portions, and a plurality of L-shaped drawbars each having a normally substantially horizontal forward end portion spaced above and passing over the rear bar of the tiller frame and a normally downturned end portion, means releasably securing the forward end portions of said drawbars to selected spaced sections of said front bar for swinging about a transverse axis, brackets affixed to the beam and having spaced sidewalls extending between the upper and lower flange portions, said upper flange portion being provided with notches aligning with said brackets to define channels receiving the normally downturned end portions of said drawbars, coupling pins releasably pivotally connecting said brackets at their lower end portions to said drawbars, said brackets including abutments at their upper end portions holding the downturned end portions of said drawbars within said channels while permitting limited play of said ground leveling beam relative to said drawbars.

5. In combination with a tractor-drawn, controllable position tiller having a frame including transverse front and rear bar members; a floating, ground scraping and leveling drag comprising a beam of a length at least as great as the width of the tiller, and means disposing and maintaining the beam transversely rearwardly of the tiller including drawbars normally spaced above and passing over the rear bar member of the tiller frame and pivot means connecting the drawbars to the forward bar member of the tiller frame for relative swinging about a transverse axis whereby the tiller depth of soil penetration may be controlled independently of the floating, ground scraping and leveling action of the drag and whereby raising of the tiller frame to an inactive position will automatically lift the drag from the ground.

References Cited in the file of this patent

UNITED STATES PATENTS

| | | |
|---|---|---|
| 615,284 | Kountz | Dec. 6, 1898 |
| 847,398 | Bowen | Mar. 19, 1907 |
| 1,284,901 | Johnson | Nov. 12, 1918 |
| 2,449,135 | Olander | Sept. 14, 1948 |
| 2,673,434 | Babinchak | Mar. 30, 1954 |